UNITED STATES PATENT OFFICE.

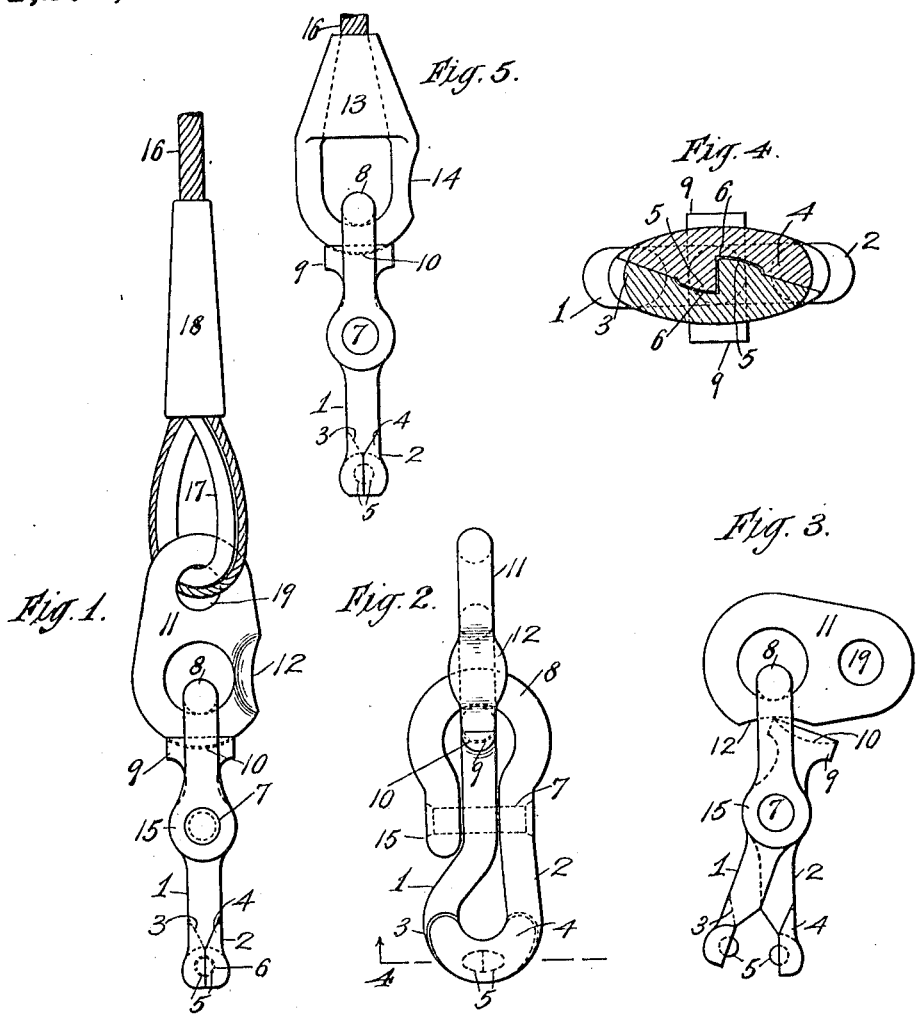

CHARLES C. SUNDERLAND, OF TRENTON, NEW JERSEY, ASSIGNOR TO JOHN A. ROEBLING'S SONS COMPANY, A CORPORATION OF NEW JERSEY.

SWING-HOOK.

1,274,469.  Specification of Letters Patent.  Patented Aug. 6, 1918.

Application filed August 21, 1917. Serial No. 187,453.

*To all whom it may concern:*

Be it known that I, CHARLES C. SUNDERLAND, a citizen of the United States, residing at Trenton, county of Mercer, and State of New Jersey, have invented certain new and useful Improvements in Swing-Hooks, fully described and represented in the following specification and the accompanying drawings, forming a part of the same.

This invention relates to improvements in swing hooks and the like and has for its object the provision of a satisfactory drop forged locking swing hook in which there are no welds, and the locking member forms half of the loop and carries its proportionate share of the applied load.

In the accompanying drawings forming a part of this specification, there is shown a swing hook embodying all the features of the invention in their preferred form and this construction will now be described in detail and the features forming the invention then specifically pointed out in the claims.

In the drawings—

Figure 1 is a side view of a locking swing hook having a wire rope terminal attached to the locking member;

Fig. 2 is a view at right angles to Fig. 1, with the rope connection omitted;

Fig. 3 is a side view similar to Fig. 1 showing the position of the parts for unlocking;

Fig. 4 is a section on the line 4—4 of Fig. 2, and

Fig. 5 is a side view showing a modification of the locking member.

Referring to the drawings,—the hook proper consists of two members 1 and 2, the hook member 2 being stationary and member 1 movable under certain conditions to open the eye formed by members 1 and 2 to thereby release the load. The members 1 and 2 are provided, respectively, with swaged portions 3 and 4 adapted to overlap, and each swaged portion is preferably provided with a lug 5 and a recess 6, the lug 5 of the one fitting within the recess 6 of the other and abutting, thereby greatly strengthening the construction against sidewise movement of the parts on each other and avoiding sidewise strain on the pivot pin 7 by which the members 1 and 2 are pivoted together. The stationary member 2 is provided at its upper end with an eye-forming portion 8, the end 15 of which is brought down parallel to the waist portion of member 2 and between these portions the movable member 1 is pivoted on pivot pin 7. At its upper end and within the eye 8, movable member 1 is provided with an enlarged head 9 having a locking surface 10 which preferably is formed in a groove, which groove aids in holding the head against sidewise play, assures the proper locking position of the parts and provides an extended locking surface in connection with the rounded surface of ring 11.

Previous to connection of these parts a locking member, shown in Figs. 1 to 4, as a locking ring 11, is passed over the end 15 and about the eye 8 of the stationary member 2, and is of such size as to fit snugly between the surface 10 in the head 9 of the movable member 1 and the eye portion 8 of the stationary member 2. At one side the locking ring 11 is provided with a cut away portion 12 which permits the head 9 of the member 1 to swing about the pivot pin 7.

The locking member 11 of Figs. 1 to 4 is provided with a hole 19 at its upper end for connection with rope 16 having the usual gromet 17 and sleeve 18. The forms of locking members which may be used are numerous and in Fig. 5 is shown one modification thereof in which the rope 16 is directly attached to the locking member which is shown as a closed socket 13 provided with the necessary cut away portion 14.

The operation of the device is as follows: When the hook members 1 and 2 are in closed position as shown in Figs. 1, 2 and 5, the locking member fits snugly between the curved surface 10 of the head 9 of member 1 and the inner wall of eye 8 carried by the stationary member 2. The coaction of the curved surface 10 and the locking member is such that the member 1 is positively locked in this position, and the eye formed by parts 1 and 2 cannot be opened. The eye is locked closed, therefore, so long as there is any strain on the hook, as the locking member 11 cannot rotate through eye 8 to release the head 9. For unlocking, the locking member is rotated approximately 90° to the position shown in Fig. 3 which brings the cut away portion 12 thereof between the eye 8 and head 9, allowing the member 1 to be swung about pivot 7.

Many advantages are obtained over prior constructions of which the following are especially important: The movable member not only provides for locking but forms half of the hook, carries its proportionate share of the applied load, and because of this provides an additional lock against release while under tension. The device is especially strong on account of the stationary member forming the complete eye at the rope end and the pivoting of the movable member of the hook between the sides of the stationary member. The construction is such that the locking ring and other parts may be made of drop forgings, thereby eliminating objectionable welds.

It is not desired that the invention be limited to the specific forms shown, as modifications may be made in the construction without departing from the invention as defined by the claims.

What is claimed is:

1. A swing hook having two hook members pivoted together, an eye formed by one of said members, a locking member linked through said eye, a head formed on the other hook member and located within and having a movement transversely through said eye and coacting with the locking member to lock said hook members together.

2. A swing hook having two hook members pivoted together, an eye formed by said members, a locking member linked through said eye, a head formed on the other hook member and located within and having a movement transversely through said eye, said head having a groove extending in the line of movement of said head and coacting with said locking member to lock said hook members together.

3. A swing hook having two hook members pivoted together, an eye formed by one of said members, a locking member linked through said eye, a head formed on the other hook member and located within and having a movement transversely through said eye, said head coacting with said locking member to lock said hook members together, said locking member being formed to release said head for unlocking the hook when the locking member is moved transversely through the eye into a certain position.

In testimony whereof, I have hereunto set my hand.

CHARLES C. SUNDERLAND.

Witnesses:
AUSTIN C. COOLEY,
HARVEY COOLEY.

Copies of this patent may be obtained for five cents each, by addressing the "Commissioner of Patents, Washington, D. C."